Aug. 18, 1964 W. L. WALTON 3,144,859
FAN-SHROUD STRUCTURE AND MOUNTING
Filed Feb. 15, 1962 2 Sheets-Sheet 1
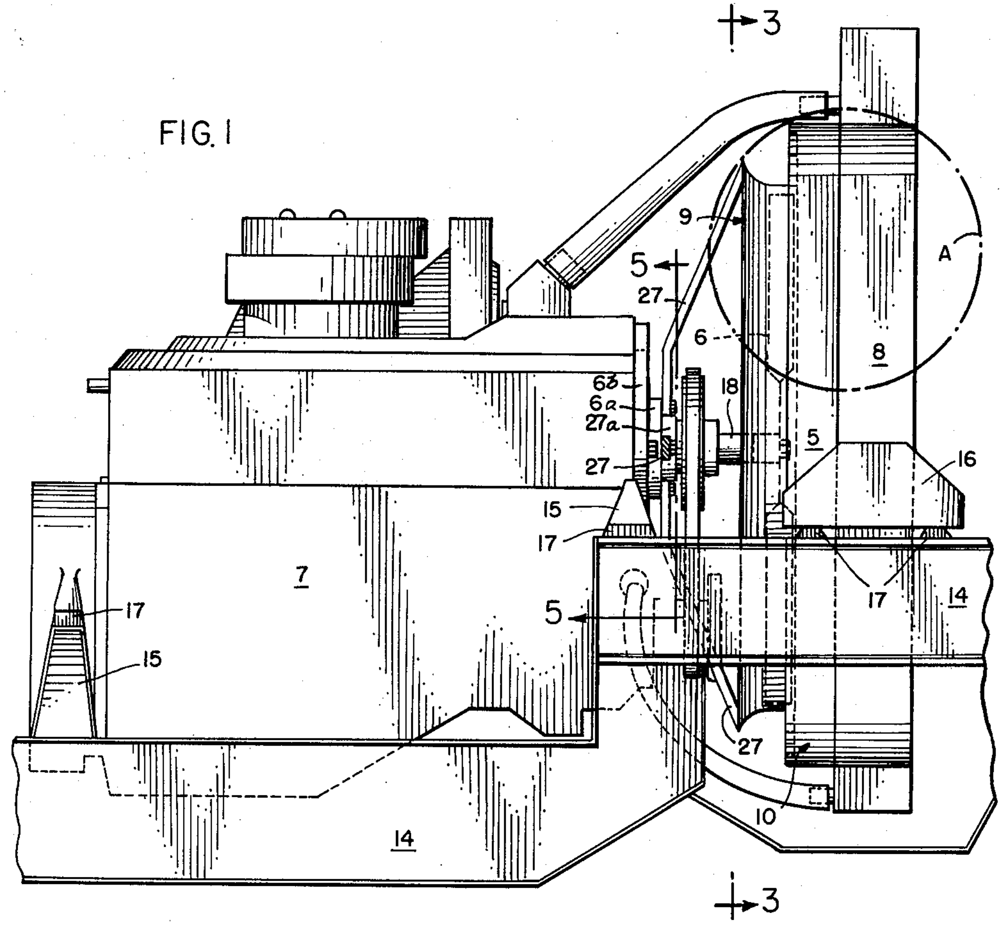
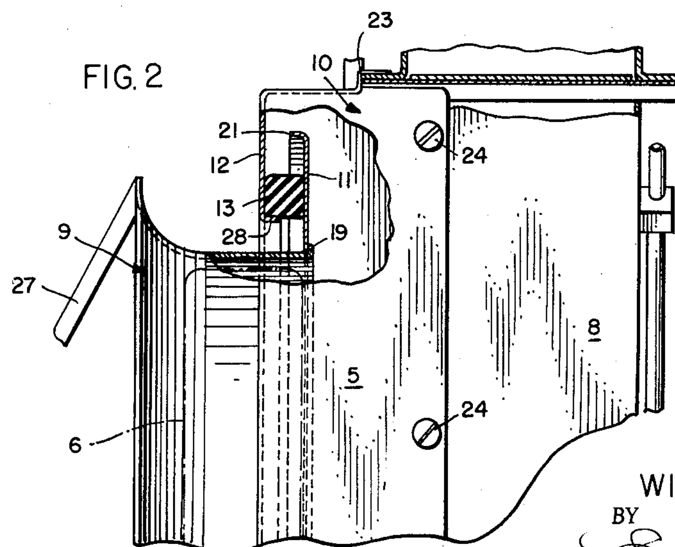
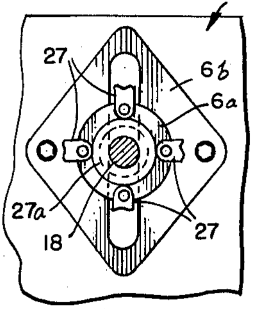
INVENTOR:
WILLIAM L. WALTON
BY
Edwin Phelps
ATT'Y Aug. 18, 1964 W. L. WALTON 3,144,859
FAN-SHROUD STRUCTURE AND MOUNTING
Filed Feb. 15, 1962 2 Sheets-Sheet 2
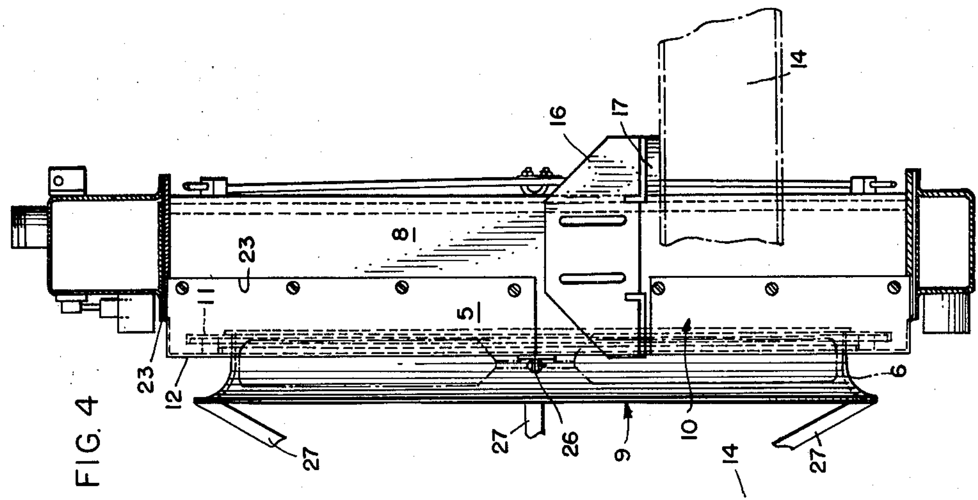
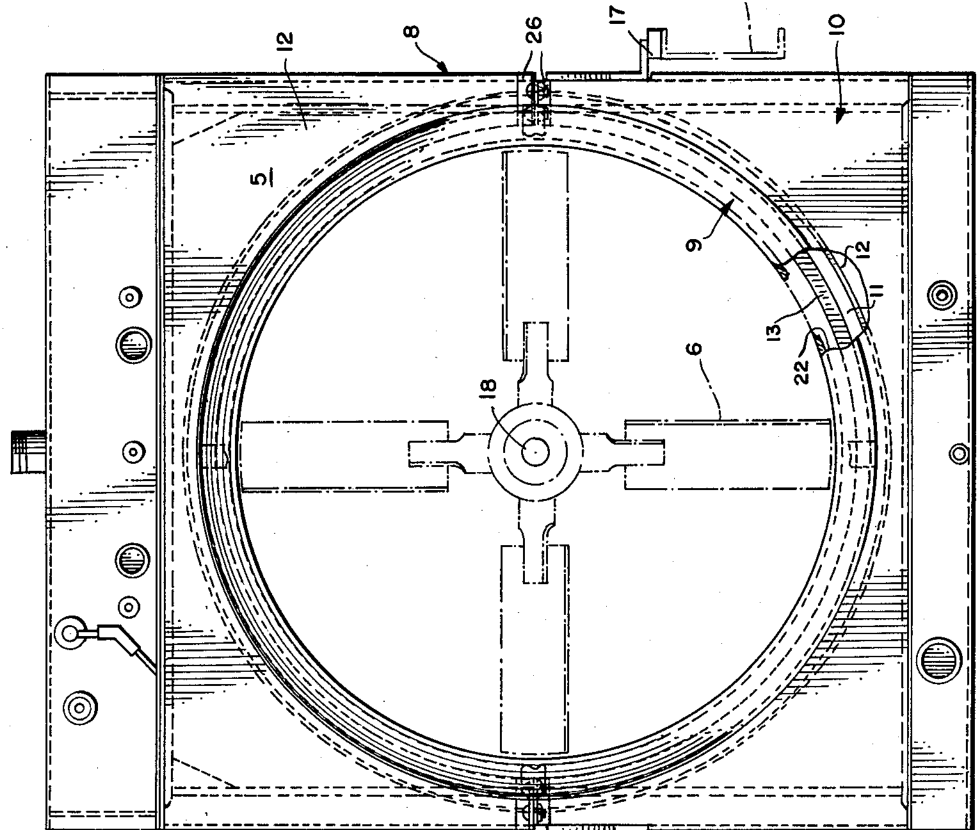
INVENTOR:
WILLIAM L. WALTON
BY
Edwin Phelps
ATT'Y United States Patent Office 3,144,859

Patented Aug. 18, 1964

3,144,859

FAN-SHROUD STRUCTURE AND MOUNTING

William L. Walton, Racine, Wis., assignor to Young Radiator Company, Racine, Wis., a corporation of Wisconsin Filed Feb. 15, 1962, Ser. No. 173,472
4 Claims. (Cl. 123—41.49)

This invention relates to the structuring and mounting of shrouds for the fans of heat-engine cooling-systems.

As is well known the cooling system for the heat engine of a motor vehicle involves a fan for effecting a flow of air through a juxtaposed radiator through which radiator there is a pump-forced circulation of a coolant to and from the engine.

The fan is mounted on a bearing more or less concentric with the radiator and radially spaced from the engine shaft from which the fan is driven by a belt. Provision has to be made for occasionally tightening the belt. More conventionally such adjustment is provided for by an idler. However, in some instances the fan is journaled on a bearing bracket adjustably supported on the engine.

In certain types of motor vehicles the fan revolves in a shroud in order to secure the maximum efficiency in heat transfer between the air and the coolant flowing through the radiator. Such provision of a fan shroud is true especially with the heavy-duty motor-driven equipment.

The current practice is to mount a unitary shroud on the radiator which, in turn, is mounted on the vehicle chassis whereon the engine also is mounted. Thus, the fan and the fan-shroud are fixed to the vehicle chassis, the fan through the medium of the engine and the shroud through the medium of the radiator.

It is a well-known fact that the less differential there is between the external diameter of the fan and the internal diameter of the shroud the more efficient will be the heat transfer between the air and the coolant flowing through the radiator. However, it also is well-known that in determining these relative diameters cognizance has to be taken of the fact that with heavy-duty motor-driven equipment there are times when there is an unavoidable relative radial movement of the fan and the shroud.

Such relative radial movement of the fan and the shroud most likely occurs either (1) when the engine is started or (2) when the equipment is traveling over rough terrain, or (3) with some motor equipment, when the fan has to be adjusted on its engine mounting. In the first two of these instances the weight differential between the engine and the radiator is so extreme that at the instant of starting the engine there is such a surge of power as to rock the engine on the chassis and cause a rather material relative radial movement of the engine and the radiator and, hence, a relative radial movement of the fan and the shroud. Similarly, when the equipment is moving over rough terrain, at fairly high speeds, the engine and the radiator may be subject to some relative radial movement hence, again, causing some relative radial movement of the fan and the shroud.

Because of these facts, heretofore, it has been imperative to provide for material annular space between the external diameter of the fan and the internal diameter of the shroud. Such a space inevitably results in a substantial reduction in the effective heat transfer, between the fluids flowing through the radiator, over what could be attained if it were not necessary to make provision for this annular space in the current shroud construction.

The main objects of this invention, therefore, are to provide an improved structuring and mounting of the fan-shroud for the engine-cooling radiators for motor-driven vehicles; to provide an improved structuring and mounting of a fan shroud of this kind which precludes any relative radial movement between the fan and that part of the shroud wherein the fan rotates; and to provide an improved fan-shroud structuring and mounting of this kind which is simple and economical to manufacture and which greatly enhances the heat transfer efficiency between the fluids flowing through the radiator.

In the adaptation shown in the accompanying drawings:

FIG. 1 is a diagrammatic, side elevation of a conventional chassis-mounted motor vehicle engine and radiator equipped with a fan shroud constructed in accordance with this invention;

FIG. 2 is an enlarged, fragmentary view, partly sectional, of that portion of this improved shroud within the circle "A" of FIG. 1;

FIG. 3 is a slightly enlarged, front elevation of the fan shroud as viewed from the plane of the line 3—3 of FIG. 1;

FIG. 4 is a side elevation of the assembly shown in FIG. 3, and

FIG. 5 is a fragmentary detail taken on the line 5—5 of FIG. 1 showing a fan bearing mounting which is adjustably supported on the engine.

The essential concept of this invention involves a fan shroud structured of two sections for mounting, respectively, on the fan bearing support and on the radiator of a motor-driven vehicle, to permit relative radial movement of the two sections of the shroud sealed by an interposed ring to preclude any air flow through the shroud other than within the area wherein the fan rotates.

A fan shroud 5 embodying the foregoing concept, for use with a fan 6, driven by an engine 7, and a radiator 8, comprises a venturi section 9 and a box section 10 having respectively radial parts 11 and 12 sealed by an interposed ring 13.

The fan 6, in the instant disclosure, is journaled on a bearing bracket **6*a* vertically adjustable in a slotted member 6*b* on the engine 7**.

The engine 7 and the radiator 8, as here shown, are diagrammatic representations of conventional equipment for motor-driven vehicles. As here shown, the engine 7 and the radiator 8 are mounted on longitudinally-extending, parallel supports 14 of the vehicle chassis. Such mountings usually involve brackets 15 and 16, respectively, with interposed cushion pads 17.

In the practice that heretofore has prevailed a unitary fan shroud has been mounted on the radiator 8 more or less concentric with the radiator which might be nearly concentric with the fan 6. Because of the likelihood of relative radial movement of such a fan and shroud, it has been imperative to provide for such a differential between the diameters of the interior of the shroud and the exterior of the fan as to preclude all possibility of the shroud ever being contacted by the rotating fan when there occurs, as inevitably there must, any relative radial movement of the engine 7 and the radiator 8, or adjustment of the fan bearing on the engine, for reasons previously explained. This diameter differential results in such an annular gap between the fan and the shroud as to produce a material loss in the engine cooling efficiency over what could be attained if the diameter differential between the fan and the shroud could avoid provision for such an annular gap.

The shroud 5 constructed, in accordance with this invention, with the separately-formed venturi section 9 and box section 10 permits these two sections to be mounted, respectively, on the engine 7 and on the radiator 8. Hence, any relative movement caused by the use of the motor-vehicle or fan adjustment, as above explained, is between the two sections of the shroud 5.

As here shown, the venturi section 9 is formed from a strip of sheet metal into a ring with a major portion thereof belled outwardly in the conventional manner for a fan shroud. The opposite perimeter is turned to form a narrow flange 19 to which is bonded the embracing annular part 11 (FIG. 2). This annular part 11, in turn, has its outer perimeter turned to form a flange 21 opposed to the sealing ring 13. The box section 10 of the shroud 5, is an assembly of two similarly-formed elements 22. Each of the elements 22 has the one radially-disposed end part cut out on a semi-circle slightly larger in diameter than the base portion of the venturi section 9. The perimeters of the rectangular sides of these elements 22 are offset transversely to form flanged rims 23 for embracive anchoring to the radiator by screw fasteners 24 (FIG. 2). Two of the elements 22 are secured in opposed relationship by pairs of bolted brackets 26 (see FIGS. 3 and 4).

The venturi section 9 here is shown secured to the fan-bearing bracket **6*a* by a plurality of arms 27 radiating out from a ring 27*a*. The box section 10, as noted above, is secured to the radiator 8. Hence, when there is any relative movement of the engine 7 and the radiator 8, or the fan 6 and the radiator 8, for the reasons hereinbefore explained, these sections 9 and 10 will have some relative radial movement. However, there is no relative movement between the fan 6 and the venturi section 9 of the shroud 5**.

Since there is no relative radial movement whatever between the fan 6 and the venturi section 9 of this shroud 5, the diameter differential between the exterior of the fan 6 and the interior of the venturi section 9 is very slight. In fact ⅛" clearance is all that is needed. As a consequence there is a material increase in the air flow through the shroud 5 to the radiator 8 with a consequent decrease in horsepower required to drive the fan 6 to secure a requisite efficiency in heat transfer between the fluids flowing through the radiator 8. Actual tests with this construction have shown a 20–30% increase in air flow through the radiator with nearly one-third reduction in horsepower required to drive the fan, over that which can be achieved in the conventional unitary shroud mounted on the radiator 8 and resulting in a material annular gap between the exterior diameter of the fan and the interior diameter of the shroud 5.

The air-seal ring 13 preferably is formed of a compressible substance such as rubber. As here shown, the ring is of rectangular cross-section and of a thickness equal to the distance between the opposed faces of the radial parts 11 and 12. The ring is of a diameter somewhat greater than the inner end of the venturi section 9. The ring seats on a circumferential flange 28 around the perimeter of the radially-disposed part of the box section 10 defining the circular opening within which the venturi section is disposed.

Variations and modifications in the details of structure and arrangement of the parts may be resorted to within the spirit and coverage of the appended claims.

I claim:

1. A shroud for a radiator fan forming part of a heat-engine cooling-system, comprising, (*a*) one metal section
of annular form
mountable on the engine
concentric with the fan
for rotation of the fan within the one section
free of any relative radial movement between the fan and the one section, (*b*) another metal section
of annular form
having one perimeter contoured for atachment to the radiator and
having the other perimeter
contoured for radial overlapping embracive positioning relative to the one section to permit relative radial movement of the two sections, (*c*) overlapping metal parts
on the respective sections
oppositely disposed
radially of the two sections in axially-spaced relationship, and (*d*) an air seal ring
interposed between the opposed faces of the overlapping parts
to confine air flow through the one section.

2. A shroud for a radiator fan forming part of a motor-vehicle heat-engine cooling-system wherein the engine and the radiator are mounted on the vehicle chassis and the fan is journaled on a bracket adjustable on the engine and comprising, (*a*) one metal section
of annular form
mountable on the fan bracket
concentric with the fan
for rotation of the fan within the one section
free of any relative radial movement between the fan and the one section, (*b*) another metal section
of annular form
having one perimeter contoured for attachment to the radiator and
having the other perimeter contoured for radial overlapping embracive positioning relative to the one section
to permit relative radial movement of the two sections, (*c*) overlapping metal parts
on the respective sections
oppositely disposed
radially of the two sections in axially-spaced relationship, and (*d*) an air-seal ring
interposed between the opposed faces of the overlapping parts
to confine the air flow through the one section.

3. A shroud for a radiator fan forming part of a heat-engine cooling-system comprising, (*a*) one metal section
of annular form
having one perimetrical portion belled radially outward and
having an annular-shaped metal part fixed on the one section and extending radially outward from the opposite perimeter, and
having arms for attachment of the one section to the engine concentrically of the fan, (*b*) another metal section
of rectangular box-like form
the one end part of which has a circular opening formed therein
with a diameter intermediate the diameter of the one metal section inwardly of the belled-out end and the exterior diameter of the annular-shaped part of the one section, and (*c*) an air-seal ring
of compressible material
interposed between the opposed faces of the annular-shaped part of the one section and of the one end part of the other section to confine the air flow through the one section.

4. A shroud of the type set forth in claim 3 wherein the annular shaped part of the one section and the one end part of the other section have their respective perimeters turned oppositely inward to form radially-spaced axially-disposed flanges opposed to the opposite faces of the air-seal ring.

References Cited in the file of this patent

UNITED STATES PATENTS

| | | |
|---|---|---|
| 1,873,379 | Frentzel | Aug. 23, 1932 |
| 2,186,837 | McMahan | Jan. 9, 1940 |
| 2,668,523 | Lamb | Feb. 9, 1954 |

FOREIGN PATENTS

| | | |
|---|---|---|
| 770,848 | Great Britain | Mar. 27, 1957 |
| 1,191,160 | France | Apr. 6, 1959 |